3,353,913
PURIFICATION OF HYDROGEN PEROXIDE
Donald O. Flach, Williamsville, and George W. Siwinski, North Tonawanda, N.Y., assignors to FMC Corporation, New York, N.Y., a corporation of Delaware
No Drawing. Filed Jan. 21, 1963, Ser. No. 252,562
4 Claims. (Cl. 23—207)

This invention relates to the purification of hydrogen peroxide, and particularly to improving the stability of contaminated, aqueous hydrogen peroxide solutions by removal of impurities.

Hydrogen peroxide is produced by both inorganic and organic processes. In a preferred inorganic process, ammonium bisulfate is electrolyzed to ammonium persulfate, this intermediate is hydrolyzed with steam to yield hydrogen peroxide and the precursor ammonium bisulfate, and the latter is recycled. A useful organic process involves alternate oxidation and reduction of an alkalated anthraquinone such as 2-ethyl anthraquinone, in a process in which the anthraquinone is dissolved in a working solvent, is reduced therein with hydrogen in the presence of a catalyst, and the reduced anthraquinone known as the corresponding anthrahydroquinone is oxidized to yield hydrogen peroxide and the original anthraquinone. Hydrogen peroxide is removed from the system with water.

Other processes for producing hydrogen peroxide have been developed. These either are variants of the above electrolytic process, in which other materials are electrolyzed to produce active-oxygen-containing compounds which can be broken down to provide hydrogen peroxide and the initial material, or other organic processes.

These known processes provide relatively dilute aqueous hydrogen peroxide solutions having an acid pH normally less than about 5, and containing measurable amounts of impurities. In the case of the electrolytic processes, the impurities are largely metallic ions, and are picked up from the source water and from the equipment. In the organic processes, the hydrogen peroxide solution contains both these metallic impurities and organic impurities produced by decomposition of the solvents and other organic compounds employed in the system.

The presence of these impurities is of great importance, since hydrogen peroxide is highly susceptible to decomposition to produce water and oxygen and this tendency to decompose is intensified by the presence of the impurities, particularly when the temperature, the pH or the concentration of the hydrogen peroxide solution or of the impurities is raised. For these reasons, special precautions must be taken in concentration of aqueous hydrogen peroxide solutions produced by these processes. Such concentration is of importance since hydrogen peroxide produced by the electrolytic process has a concentration of only about 10 to 50%, and by the organic anthraquinone process has a concentration of only about 15 to 40%, while in eventual use it frequently must be stored and shipped at concentrations of on the order of 50 to 90% or even higher. Even where it is desired to ship and use the hydrogen peroxide at the concentration at which it is produced initially, however, the impurities must be removed in order to provide the stability required for safe and economic handling and storage.

One useful method for purifying hydrogen peroxide produced electrolytically is recited in U.S. Patent 2,664,889. In this purification and concentration process, electrolytic hydrogen peroxide containing substantial amounts of impurities is evaporated under vacuum to a point approaching, but short of, that where the decomposing action of the catalytic impurities is critical, normally until the residue in the evaporator is about ⅛ of the initial weight. These residues contain substantially ⅞ of the non-volatile impurities from the feed and a high concentration, on the order of 70%, of hydrogen peroxide. In order to avoid decomposition of this residue by the impurities, the residue is cooled and fed to a dilution tank where it is diluted with water and the diluted residue is returned to a suitable point in the process from which the hydrogen peroxide is obtained.

This process provides a high degree of concentration of the hydrogen peroxide, and produces a sufficiently pure product. However, it produces a residue which contains the initial impurities along with a substantial amount of hydrogen peroxide. This residue either must be returned to the base process for producing hydrogen peroxide, or must be purged with consequent loss of some of the hydrogen peroxide product. In any event, catalytic impurities in the recycle system must eventually be disposed of.

U.S. Patent 2,676,923 teaches a method applicable to both electrolytic and anthraquinone process hydrogen peroxide, namely, treatment of the aqueous hydrogen peroxide with an ion exchange resin such as Dowex-50, to remove impurities. Not all of the impurities are removed by this process, and the organic and inorganic impurities which are removed from the hydrogen peroxide must be purged from the ion exchange resin itself. If they are permitted to build up, they tend to decompose the hydrogen peroxide as it goes through the bed.

It will be seen, therefore, that methods of purifying hydrogen peroxide to remove impurities, a difficult problem by reason of the basic instability of the material in question and the deleterious effect of high temperatures, pH's, and concentrations of both the hydrogen peroxide and the impurities, have been both necessary and unsatisfactory in some respects.

It is a feature of the present invention to provide a method of purifying aqueous hydrogen peroxide and improving its stability by removing decomposition-accelerating impurities from it.

It is a further feature of this invention to provide such a process which operates economically and on hydrogen peroxide derived from essentially any source, to produce a product having a sufficiently small impurities content so that it can be concentrated safely by distillation, and where concentration is not necessary, it can be shipped and used directly without need for purification by distillation.

It has been found, quite surprisingly, that deleterious impurities can be removed readily from an aqueous, acidic hydrogen peroxide solution having a pH of less than about 5 by a process which involves adding to the hydrogen peroxide solution, sufficient hydrogen peroxide-compatible alkali to adjust the pH of the solution to from about 5.6 to about 7.5, thereby causing impurities to convert to insoluble solids and separating these solids from the solution. Where the hydrogen peroxide is to be distilled and/or stored for a substantial time, the pH of the hydrogen peroxide then preferably is adjusted to about 1.2 to 3.5 with a hydrogen peroxide-compatible acid to provide a stable environment for this hydrogen peroxide.

In the preferred embodiment of this invention, an aqueous acidic solution of hydrogen peroxide first is treated by addition of a metal salt which is soluble in aqueous hydrogen peroxide at a pH of less than about 5 and which at a pH of about 5.6 to 7.5 converts to an insoluble condition. Typical useful salts are aluminum sulfate and the like. Following this, the pH of the resulting aqueous solution is raised to about 5.6 to 7.5 with a hydrogen peroxide-compatible alkali, whereupon the metal salt is converted to an insoluble condition, in the case of aluminum sulfate to aluminum hydroxide, a flocculating agent, and the impurities in the hydrogen peroxide are caused to precipitate. This co-precipitation of the flocculating agent from the metal salt and the impurities in the hydrogen peroxide results in adsorption of the impurities on the flocculating agent, thereby facilitating their physical removal from the solution. The resulting purified aqueous hydrogen peroxide solution then may be treated by addition of an acid to change it to an acid pH on the order of 1.2 to 3.5, as described above, where it is desirable to do so.

It is particularly surprising that the present process operates to improve stability of aqueous hydrogen peroxide solutions by removal of impurities therefrom, without itself effecting substantial decomposition of the sensitive active oxygen compound. Hydrogen peroxide is known to be especially susceptible to decomposition at pH's above about 5 to 6, and the herein process operates by raising the pH of the aqueous hydrogen peroxide solution to about 5.6 or higher while the impurities are in a particularly active state. However, as will be shown hereinafter in the working examples, the present process acts to remove impurities from aqueous hydrogen peroxide solutions effectively to produce an unusually stable hydrogen peroxide product.

The hydrogen peroxide treated by the process of this invention has a pH of less than about 5, usually on the order of 0.5 to 5, and when derived from inorganic processes usually contains catalytic inorganic impurities in the amount of 0.2 to 10 parts per million (p.p.m.). These catalytic impurities comprise soluble salts of iron, chromium, copper, manganese and other materials, all of which have a deleterious effect on the hydrogen peroxide, particularly at elevated temperatures and at an elevated pH.

Hydrogen peroxide produced by organic processes contains substantial amounts of these metallic impurities, and also organic impurities carried over from the working solutions employed to produce the hydrogen peroxide. These impurities are produced by decomposition of the hydrogen peroxide-producing working solution, and are evidenced by discoloration of the hydrogen peroxide when it is stored for on the order of 24 to 72 hours at ambient temperatures, or when it is heated to about 70° C. for 3–4 hours. A measure of organic impurities is that so called color value, which upon aging of the hydrogen peroxide ranges from zero to about 10 on a ferric chloride scale described in U.S. Patent 3,043,666. A color of zero corresponds to the color of a slightly acidic aqueous solution containing 0.054 g.p.l. $FeCl_3$, while a color of 10 corresponds to a solution containing 1.13 g.p.l. $FeCl_3$.

Both described kinds of impurities have a deleterious effect on the stability of the hydrogen peroxide solution on storage, and it is therefore desirable to remove them from the solution. The present process reduces the inorganic contaminants to a concentration of on the order of 0.06 to 0.10 p.p.m. in the absence of the preferred embodiment employing a flocculating agent, and to as low as about 0.04 to 0.08 p.p.m. when the flocculating agent, preferably aluminum sulfate, is employed. With respect to the organic impurities, it has been found that the color value of an aged hydrogen peroxide can be cut in half or reduced even further by the present process.

The hydrogen peroxide treated by the herein process normally has a concentration of about 15 to 35%. However, certain special processes produce hydrogen peroxide initially having a concentration of 50% or even higher; such a process is described in U.S. Patent 2,966,398. Hydrogen peroxide at such concentrations can be treated by the present process. Furthermore, hydrogen peroxide at any concentration may pick up impurities on storage, and the present process can be used effectively to remove these acquired impurities. Accordingly, the herein process can be used to treat aqueous acidic hydrogen peroxide at any concentration, to provide a purified product.

Measurement of pH in aqueous hydrogen peroxide solutions is normally carried out with a Beckman pH meter employing glass electrodes. It should be noted that as the concentration of the hydrogen peroxide in the solution goes substantially above about 15 to 30%, a correction factor must be applied to the pH value derived by the use of the glass electrodes. This factor is described in Journal of the American Chemical Society 79, 531 (1957) "The Behaviour of the Glass Electrode in Hydrogen Peroxide Solutions" and relates the glass electrode value to the true pH in the following fashion:

TABLE 1

| Percent $H_2O_2$ | Correction—pH units to be added to measured pH |
|---|---|
| 20 | 0.4 |
| 40 | 1.1 |
| 60 | 2.2 |
| 80 | 3.8 |
| 100 | 6.6 | pH values recited herein are the true pH values determined by measuring the pH of the aqueous hydrogen peroxide solution with a glass electrode and applying the correction factor described in the above table.

The alkali employed to treat the hydrogen peroxide is one which is compatible with hydrogen peroxide, for example ammonium hydroxide, sodium hydroxide, potassium hydroxide or anhydrous ammonia. Other hydrogen peroxide-compatible alkaline agents may be employed and such alkalies are well known. They are added in an amount to raise the pH of the solution to about 5.6 to 7.5. If a pH below 5.6 is employed, incomplete precipitation of impurities and also of the flocculating agent, where it is used, occurs. If a pH above 7.5 is employed, an unstable condition is created.

Upon addition of the alkaline treating agent, the metal salt and the impurities in the hydrogen peroxide solution are largely converted to insoluble condition, such that they precipitate and can be removed by simple physical methods such as filtration, centrifugation and the like.

In the preferred embodiment of this invention, an aluminum or other flocculant-producing salt is added to the aqueous hydrogen peroxide solution prior to addition of the alkali. These salts preferably are aluminum salts such as aluminum sulfate, aluminum nitrate, aluminum chloride, aluminum potassium sulfate and aluminum ammonium sulfate, although magnesium salts such as the sulfate may be employed in their place. They are employed in the amount of about .005 to .080 gram per liter expressed as metal ion; if less than the lower amount is employed, they do not provide effective assistance in removal of precipitated impurities, while addition of more than the upper indicated amount confers no added benefit.

These additives act by converting from soluble condition at an initial pH of less than about 5 to an insoluble, flocculated condition at the pH created by the added alkali. The flocculant adsorbs precipitated impurities and aids in their removal. It is of course possible to employ other flocculating agents and filter aids such as cellulose flock and the like, rather than to employ the metal salts; such use of mechanical separation aids falls within the scope of this invention as described in the appended claims.

Acid preferably is used to adjust the final pH of the aqueous hydrogen peroxide solution, following treatment with alkali and removal of precipitated impurities to about 1.2 to 3.5. This treatment is carried out when use of the hydrogen peroxide calls for an acid system, or where the hydrogen peroxide solution is to be shipped or stored for a substantial time; in the latter case, the solution is acidified to create a favorable environment for stability of the hydrogen peroxide. In connection with stability, the usual hydrogen peroxide stabilizing agents, for example, dipicolinic acid, tin salts, sequestering agents, and the like may be added to the purified hydrogen peroxide solution to provide maximum stability on storage or in use.

Useful acids for adjusting the pH of the purified hydrogen peroxide solution include phosphoric acid, sulfuric acid, other hydrogen peroxide-compatible acids. The phosphoric acid is particularly suitable since it has a stabilizing effect on active oxygen compounds in addition to its pH-adjusting effect. It is apparent that acids such as hydrochloric acid which act to decompose hydrogen peroxide are not to be employed.

The herein process preferably is carried out at ambient temperatures, for example at about 15 to 25° C., at elevated temperatures hydrogen peroxide stability decreases, particularly in the presence of impurities, so that it is not desirable to operate above about 25° C., and there is no need to refrigerate the system to operate below about 15° C. However, if desired the process can be carried out at any temperature between the boiling and freezing points of the solutions, provided the normal decomposition of the hydrogen peroxide at elevated temperatures can be tolerated.

Simple mixing procedures can be employed to carry out the herein mixing of ingredients; there is no need to employ special mixing equipment. Removal of precipitated ingredients can be effected by ordinary physical separation methods such as filtration, centrifugation and the like.

*Example 1*

An aqueous hydrogen peroxide solution having a true pH of 1.8 and a concentration of 50% of hydrogen peroxide was derived by electrolysis of ammonium bisulfate to ammonium persulfate and hydrolysis of the latter to proxide hydrogen peroxide, followed by distillation of the hydrogen peroxide which was received at a concentration of 27½%. This hydrogen peroxide solution contained catalytic inorganic impurities to the extent of about 0.53 p.p.m., including about 0.33 p.p.m. of iron ions, 0.05 p.p.m of copper ions and about 0.15 p.p.m. of chromium ions. About 7 ml. of 28% aqueous ammonium hydroxide solution was added to one liter of this aqueous hydrogen peroxide solution to raise the pH of the solution to 5.6. The treatment was carried out at 35° C. for 15 minutes with stirring. A precipitate formed in the solution upon addition of the alkali and this precipitate was filtered from the solution. The pH of the solution was then dropped to 2.1 with phosphoric acid. The iron content of the solution was reduced from its initial level of 0.33 to 0.04 p.p.m., the copper from 0.05 to 0.02 p.p.m. and the chromium content from the initial 0.15 to a final 0.03 p.p.m. The stability of the hydrogen peroxide was improved from 63% loss of hydrogen peroxide at 100° C. in 6 hours to 14% loss at 100° C. in 6 hours.

*Example 2*

An aqueous solution containing 27½% of hydrogen peroxide derived by the electrolytic method used to produce the hydrogen peroxide treated in Example 1, and containing 0.19 p.p.m. of iron ions and 0.06 p.p.m. of chromium ions, and having a pH of 1.8, was treated in this example. About 7 ml. of 28% aqueous ammonium hydroxide solution was added to one liter of this hydrogen peroxide solution to adjust the pH to 7.3 and the mixture was stirred at 25° C. for 15 minutes. A precipitate formed which was removed by filtration. The iron content of the solution was reduced by this process from the initial 0.19 to 0.05 p.p.m. and the chromium content was reduced from 0.06 to 0.008 p.p.m. The stability of the hydrogen peroxide was improved from an initial 85% loss at 100° C. in 6 hours to a 60% loss at 100° C. in 6 hours, despite the lack of adjustment of final pH below the 7.3 which it had after addition of the ammonium hydroxide.

*Example 3*

Aluminum sulfate in the amount of 0.13 gram for one liter of hydrogen peroxide solution was added to a 50% hydrogen peroxide solution prepared by distilling water from a hydrogen peroxide as prepared in Example 1, and containing 0.235 p.p.m. of iron, 0.15 p.p.m. of copper and 0.05 p.p.m. of chromium, and having a pH of 1.2. When the aluminum sulfate had completely dissolved, the pH of the solution was raised to 6.5 by the addition of 7 ml. of 28% aqueous ammonium hydroxide solution. The precipitate which formed was removed by filtration, and the pH of the purified hydrogen peroxide was adjusted to 2.1 by the addition of phosphoric acid. This treatment resulted in the reduction of iron in the solution from its initial 0.235 p.p.m. to 0.057 p.p.m., reduction of copper from 0.15 to about 0.03 p.p.m. and the reduction of chrominum from 0.05 to 0.005 p.p.m. The stability increased from 65% loss in 6 hours at 100° C. to 1% loss at 100° C. in 6 hours.

*Example 4*

An aqueous hydrogen peroxide solution containing 20% of hydrogen peroxide and having a pH of 2, and derived from the anthraquinone process for producing hydrogen peroxide, in which 2-ethylanthraquinone was employed as the working compound, was allowed to age over 144 hours at 20° C. such that the organic impurities present caused the color value to raise to a value of 8. Aluminum sulfate was added to 1 liter of this solution in an amount of one gram, and the pH was raised to 6 with concentrated ammonium hydroxide. The solution was then allowed to stand at 25° C. with mild agitation for 20 minutes. A precipitate formed which was removed by filtration with the aid of a neutral, inert filter-aid and the resulting hydrogen peroxide solution had a color value of 4. The pH was then adjusted to 2.5 with phosphoric acid and the purified product was found to lose only 21% of its active oxygen on being heated for 17 hours at 100° C., whereas untreated control hydrogen peroxide solution was found to lose 95% of its active oxygen on being heated for 17 hours at 100° C.

*Example 5*

Treatment by the present process of hydrogen peroxide produced electrolytically or by organic processes, but employing in place of ammonium hydroxide, sodium hydroxide or potassium hydroxide, or employing in place of aluminum sulfate, other aluminum salts or magnesium salts such as aluminum nitrate or magnesium sulfate, results in removal of impurities to essentially the same extent as demonstrated by the above Examples 1 through 4.

It will be seen from the above examples that hydrogen peroxide produced by various procedures can be treated by the present method to reduce the concentration of hydrogen peroxide-decomposing impurities to a marked extent. This results in production of a hydrogen peroxide solution which can be distilled readily without undue concentration of impurities, and the consequent need for discarding substantial amounts of hydrogen peroxide along with these impurities in the still residue. Furthermore, the fact that less impurities are present in the distillation process means that there is less decomposition of hydrogen peroxide by the impurities in the still or in other processing steps. Likewise the low impurities content of the treated aqueous hydrogen peroxide makes it possible to store or use the material safely without need for further purification.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the inven-

What is claimed is:
1. Method of purifying an aqueous acidic hydrogen peroxide solution having a pH of less than 5 and containing impurities from the group consisting of inorganic metal salts, organic impurities which derive from work solutions used in production of hydrogen peroxide by an organic process and mixtures of said inorganic and organic impurities, which impurities catalyze decomposition of the hydrogen peroxide, comprising adding a hydrogen peroxide-compatible alkali to said aqueous hydrogen peroxide solution in an amount to raise the pH thereof to 5.6 to 7.5, at a temperature between the freezing point and the boiling point of said solution, to cause said impurities to precipitate as insolubles, removing said insoluble impurities to provide remaining purified aqueous hydrogen peroxide solution containing only on the order of 0.06 to 0.10 parts per million of inorganic impurities where the impure hydrogen peroxide contained about 0.2 to 10 parts per million of said inorganic impurities, and acidifying said purified aqueous hydrogen peroxide solution to a pH of 1.2 to 3.5 with a hydrogen peroxide-compatible acid.

2. Method of claim 1 in which the acid employed to adjust the pH of the purified aqueous hydrogen peroxide solution is phosphoric acid.

3. Method of purifying an aqueous acidic hydrogen peroxide solution having a pH of less than 5 and containing impurities from the group consisting of inorganic metal salts, organic impurities which derive from work solutions used in production of hydrogen peroxide by an organic process and mixtures of said inorganic and organic impurities, which impurities catalyze decomposition of the hydrogen peroxide, comprising adding to said aqueous hydrogen peroxide solution a metal salt selected from the group consisting of aluminum and magnesium salts which is soluble in water at a pH below 5 and precipitates therefrom at a pH in the range of 5.6 to 7.5, in the amount of above about .005 gram per liter expressed as the metal based on said aqueous hydrogen peroxide solution, adding to the resulting solution a hydrogen peroxide-compatible alkali in an amount to raise the pH of the solution to 5.6 and 7.5, at a temperature between the freezing point and the boiling point of said solution, to cause said impurities in said aqueous hydrogen peroxide solution and said metal salt to convert to insoluble condition, removing said insoluble impurities and insolubles from said metal salt to provide remaining purified aqueous hydrogen peroxide solution containing on the order of 0.04 to 0.08 part per million of inorganic impurities where the impure hydrogen peroxide contained about 0.2 to 10 parts per million of said inorganic impurities, and acidifying said purified aqueous hydrogen peroxide solution to a pH of about 1.2 to 3.5 with a hydrogen peroxide-compatible acid.

4. Method of claim 3 in which the acid employed is phosphoric acid.

References Cited

UNITED STATES PATENTS

| | | | |
|---|---|---|---|
| 1,275,765 | 8/1918 | Schaidhulf | 23—207.5 |
| 1,958,204 | 8/1934 | Reichert | 23—207.5 |
| 2,027,838 | 1/1936 | Reichert | 23—207.5 |
| 2,027,839 | 1/1936 | Reichert | 23—207.5 |
| 2,658,818 | 11/1953 | Shanley et al. | 23—207.5 |
| 3,098,714 | 7/1963 | Kabisch et al. | 23—207 |
| 3,126,257 | 3/1964 | Kunowski et al. | 23—207 |

OTHER REFERENCES

Schumb et al., "Hydrogen Peroxide," pages 80, 109–111, 119, 136, 143, 144, 160, 161. Reinhold, N.Y., 1955.

OSCAR R. VERTIZ, *Primary Examiner.*

O. F. CRUTCHFIELD, H. S. MILLER, *Assistant Examiners.*